Aug. 4, 1925.
A. STEINBART
GAS CLEANER
Filed March 13, 1923  2 Sheets-Sheet 1
1,548,066
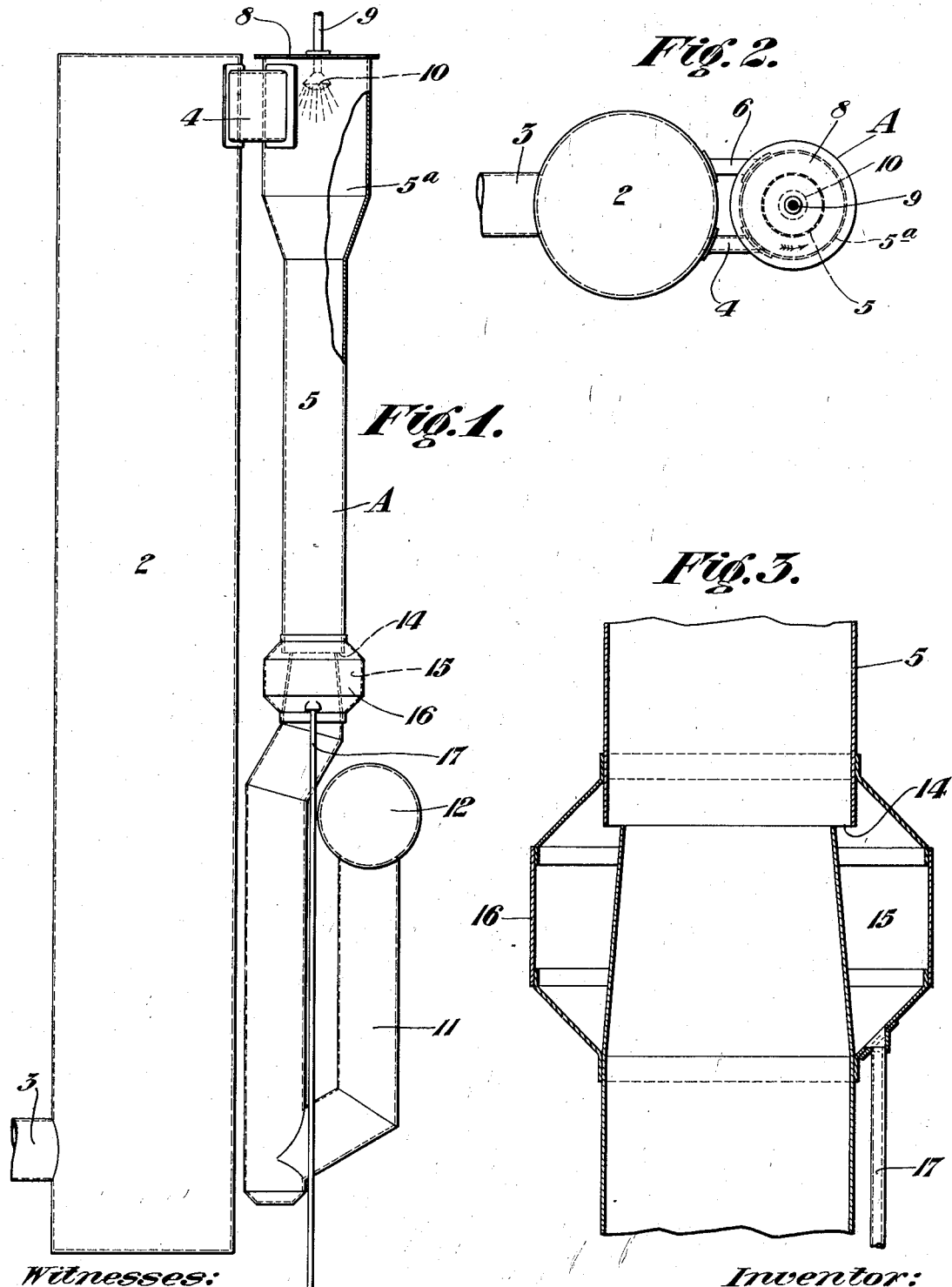
Inventor:
ALFRED STEINBART,
by D. Anthony Usina
his Attorney.

Aug. 4, 1925.　　　　　　　　　　　　　　　　　　1,548,066
A. STEINBART
GAS CLEANER
Filed March 13, 1923　　　2 Sheets-Sheet 2
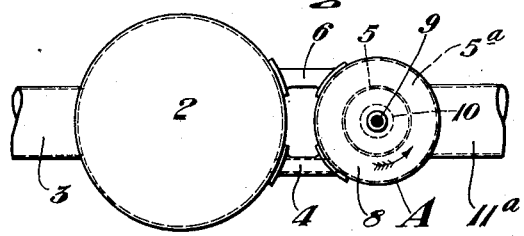
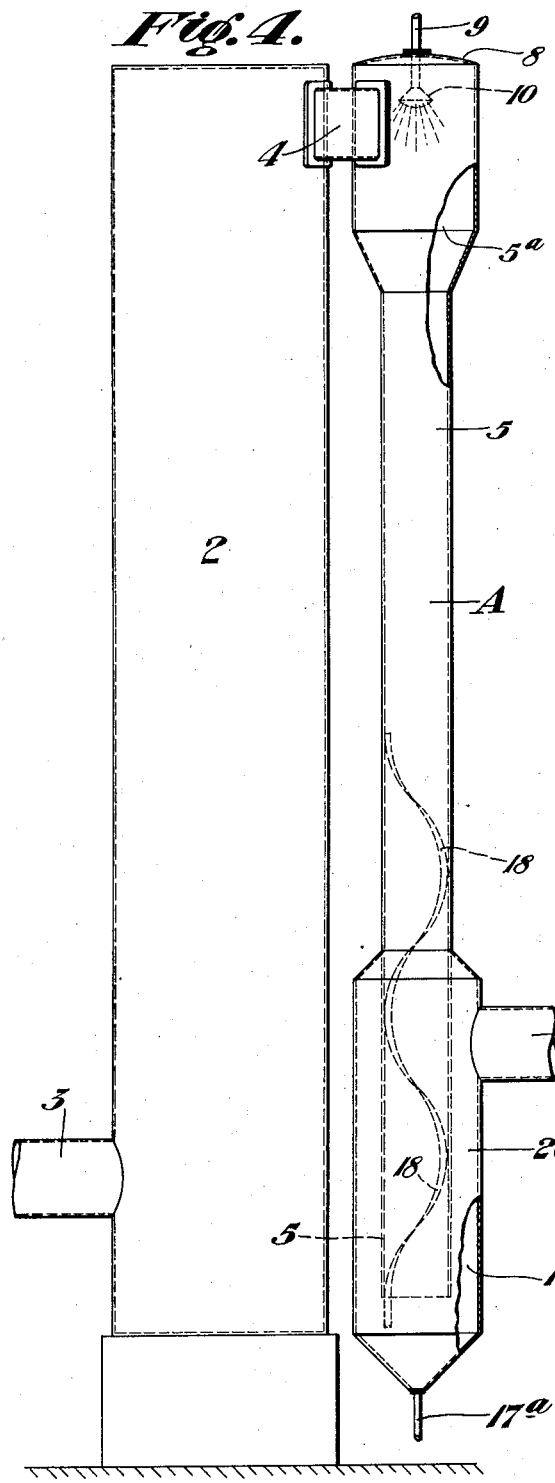
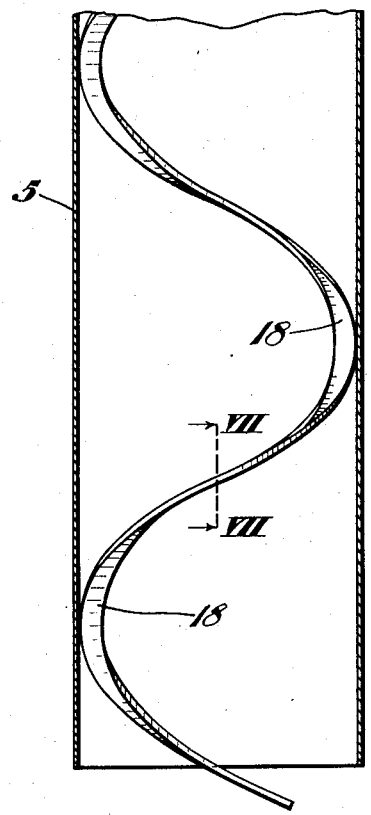
Inventor:
ALFRED STEINBART,
by:
his Attorney.

Patented Aug. 4, 1925.

1,548,066

UNITED STATES PATENT OFFICE.

ALFRED STEINBART, OF PITTSBURGH, PENNSYLVANIA.

GAS CLEANER.

Application filed March 13, 1923. Serial No. 624,758.

*To all whom it may concern:*

Be it known that I, ALFRED STEINBART, a citizen of the United States, and resident of Pittsburgh, in the county of Allegheny and State of Pennsylvania, have invented certain new and useful Improvements in Gas Cleaners, of which the following is a specification.

This invention appertains to gas cleaners of the type used in removing finely divided solids from blast furnace and similar impurity laden gases. The invention more particularly relates to gas cleaners used as secondary cleaners or mud catchers for separating mud and entrained water from previously washed gases after the passage of the gases through a primary washer.

One object of my invention is the provision of a cleaner or mud catcher in which mud and entrained water in suspension in the washed gases are separated therefrom by centrifugal force and are trapped and segregated in the passage of the gases through the mud catcher.

Another object of the invention is to provide a mud catcher having the novel construction, arrangement and combination of parts described in the following specification and illustrated in the drawings forming part of this specification.

In the accompanying drawing, Figure 1 is a side elevation showing a gas washer embodying the novel features of my invention.

Figure 2 is a plan of the apparatus shown in Figure 1.

Figure 3 is a sectional elevation, on a larger scale, showing details in the construction of the trap portion of the mud catcher of Figures 1 and 2.

Figure 4 is a side elevation showing a modified form of mud catcher applied to a gas washer in accordance with my invention.

Figure 5 is a plan of the apparatus of Figure 4.

Figure 6 is a sectional elevation showing the mud trapping portion of the mud catcher of Figures 5 and 6.

Figure 7 is an enlarged sectional detail on the line VII—VII of Figure 6.

Referring more particularly to the drawings, the numeral 2 designates a gas washer as a whole, which may be of any known and approved construction. The gas washer, which is of cylindrical cross section, is provided with a gas inlet 3 adjacent to its lower end and a gas outlet near its upper end.

The secondary gas cleaner or mud catcher A, which is shown located alongside of and lengthwise parallel with the gas washer 2, comprises a tubular lengthwise vertical casing 5, the enlarged upper end of which forms a separating chamber $5^a$. The outlet on the upper end of the gas washer 2 is connected by a nozzle 4 to the upper end of the separating chamber $5^a$, thereby forming a tangential inlet through which the gases pass from the gas washer 2 into the mud catcher 5. A second nozzle casting 6 is secured by its flanged ends to the shell of the gas washer 2 and mud catcher casing. The casting 6 does not communicate with the interior of either, but, because of its shape and size, forms a convenient means, which in conjunction with the nozzle 5 securely fastens the upper end of the casing 5 to the shell of the washer 2.

The upper end of the casing 5 is closed by a plate or head 8, and a water conduit 9 having an atomizing nozzle 10 on its lower end extends through the plate 8 on the axis of the upper portion of the casing 5 to supply water, in the form of a fine mist, to the cleaning chamber $5^a$.

The clean gas outlet on the lower end of the casing 5 is connected by an upwardly extending conduit 11 with a clean gas main 12, through which the cleaned gases are led to a place of use or storage.

The casing 5 is divided transversely at an intermediate point in its length and the upper end of the lower portion thereof is tapered inwardly to a materially smaller diameter than the lower end of the upper portion, these adjoining ends being relatively located so as to form an annular trapping space or opening 14 to trap the mud and entrained water separated from the gases in the operation of the mud catcher.

A mud and water receiving chamber 15, which encloses the trapping space or opening 14, is formed by the casing 16 which is secured to the adjoining ends of the upper and lower portions of the casing 5. A drain pipe 17, which leads from the lower end of the chamber 15 to a suitable dump, settling basin or the like, conducts the segregated mud and water from the chamber 15 as collected therein.

The gases, in passing through the washer 2, accumulate considerable moisture and the dust or finely divided solids in suspension therein absorb water. In the operation of my improved mud catcher or secondary cleaner the gases and humid dust or mud and a certain amount of entrained water, pass from the gas washer 2, through the nozzle 4 into the separating chamber 5ª. Due to the nozzle 4 opening tangentially into the chamber 5ª of the mud catcher a whirling motion is imparted to the gases, and the restricted area of the nozzle increases the velocity of the gases entering the cleaning chamber 5ª.

The atomizing nozzle 10 causes the water supplied thereby to enter the chamber 5ª at the center of the whirling gases, and the small drops of water forming the mist are picked up by and caused to travel with the whirling stream of gases. The gases, in picking up the mist and imparting motion to the small drops of water forming the mist, impart energy to the water, at the cost of lessened velocity, and the centrifugal force or pressure of the gases against the annular enveloping layer of gases also is lessened. In this way the gases are caused to travel from the casing wall inwardly, toward the axial center of the mud catcher, and then downwardly. The drops of water forming the mist and the wet solid impurities, being heavier than the gases and being propelled by centrifugal force, are thrown outwardly in a horizontal direction into contact with the surface of the chamber 5ª and casing 5 and form an annular layer of mud and water which trickles or flows downwardly.

The annular downwardly moving layer of mud and water passes through the annular trap 14 into the chamber 15 and is collected in the chamber 15, from which it flows through the drain pipe 17, while the cleaned gases pass on through the lower portion of the chamber and through the outlet conduit 11 to the clean gas main 14.

In the modification shown in Figures 4, 5, 6 and 7, the mud catcher is substantially the same as that shown in Figures 1, 2 and 3. One difference is that the casing 5 forming the separation chamber 5ª is not divided transversely, as in the preferred form to form a trap. In this modified form a gutter or channel 18, which forms the trap, is arranged spirally on the casing 5 adjacent its lower end to trap the annular layer of mud and water, and a clean gas collecting chamber 19 is formed around the lower end of the casing 5 by the casing 20, which surrounds the lower end of the casing 5 and extends upwardly for an appreciable distance therearound. The gutter or channel 18 extends downwardly below the lower end of the casing 5 into the chamber 19 and delivers the mud and water, separated from the gases in the chamber 5ª into the lower end of the chamber 19, from which it is drained by a drain pipe 17ª.

The operation of this modified form of mud catcher is substantially the same as the preferred form, with the exception that the annular layer of mud and water is collected in the gutter or channel member 18 instead of passing through the annular trap opening 14, as in Figures 1, 2 and 3.

It will be understood that I do not wish to be limited to the exact construction shown and described, since various modifications may be made without departing from the scope of my invention as defined in the appended claims.

I claim:—

1. A gas cleaner comprising a receptacle arranged symmetrically around a vertical axis, a tangential gas inlet in the side of said receptacle adjacent its upper end, said tangential inlet being adapted to impart a whirling motion to the impurity laden gases entering through said inlet, a liquid atomizing nozzle in the axis of said receptacle on a level with the tangential gas inlet adapted to deliver and intimately mix atomized liquid with the center of the whirling gases whereby solid impurities and atomized liquid in the gases are thrown centrifugally to the wall of said receptacle, a trap in the lower part of said receptacle adapted to catch and segregate downwardly flowing liquid and humid impurities on the wall of said receptacle, and means for removing the water and impurities from said trap, and a gas outlet from the lower part of said receptacle.

2. A gas cleaner comprising a receptacle arranged symmetrically around a vertical axis, a tangential gas inlet in the side of said receptacle adjacent its upper end, said tangential inlet being adapted to impart a whirling motion to the impurity laden gases entering through said inlet, a liquid atomizing nozzle in the axis of said receptacle on a level with the tangential gas inlet adapted to deliver and intimately mix atomized liquid with the center of the whirling gases whereby solid impurities and atomized liquid in the gases are thrown centrifugally to the wall of said receptacle, means adjacent the lower end of said receptacle for trapping the downwardly flowing liquid and humid impurities on the wall of said receptacle, and a gas outlet for the cleaned gases adjacent the lower end of said receptacle.

3. A gas cleaner comprising a receptacle arranged symmetrically around a vertical axis, the upper part of said receptacle being of a larger diameter than the lower part, a tangential gas inlet in the side of said receptacle adjacent its upper end, said tangential inlet being adapted to impart a whirling motion to the impurity laden gases entering through said inlet, a liquid atomizing nozzle in the axis of said receptacle on a level with the tangential gas inlet adapted to deliver and intimately mix atomized liquid with the center of the whirling gases whereby solid impurities and atomized liquid in the gases are thrown centrifugally to the wall of said receptacle, a trap in the lower part of said receptacle adapted to catch and segregate downwardly flowing liquid and humid impurities on the wall of said receptacle, and means for removing the water and impurities from said trap, and a gas outlet from the lower part of said receptacle.

4. The combination with a gas cleaner, of a secondary gas cleaner comprising a receptacle arranged symmetricaly around a vertical axis, the upper part of said receptacle being of a larger diameter than the lower part, a tangential gas inlet in the side of said receptacle adjacent its upper end, said tangential inlet being adapted to impart a whirling motion to the impurity laden gases entering through said inlet, a liquid atomizing nozzle in the axis of said receptacle on a level with the tangential gas inlet adapted to deliver and intimately mix atomized liquid with the center of the whirling gases whereby solid impurities and atomized liquid in the gases are thrown centrifugally to the wall of said receptacle, a trap in the lower part of said receptacle adapted to catch and segregate downwardly flowing liquid and humid impurities on the wall of said receptacle, and means for removing the water and impurities from said trap, and a gas outlet from the lower part of said receptacle.

In testimony whereof, I have hereunto signed my name.

ALFRED STEINBART.